A. J. WIKANDER.
GEARING.
APPLICATION FILED AUG. 5, 1907.

978,252.

Patented Dec. 13, 1910.

5 SHEETS—SHEET 1.

Witnesses:
John J. Mielis
Martin Zimansky.

Inventor
Anders Johan Wikander
By his Attorney
A. K. de Bonneville

A. J. WIKANDER.
GEARING.
APPLICATION FILED AUG. 5, 1907.

978,252.

Patented Dec. 13, 1910.

5 SHEETS—SHEET 3.

Witnesses:
John J. Miller
Martin Zinransky

Inventor
Anders Johan Wikander
By his Attorney

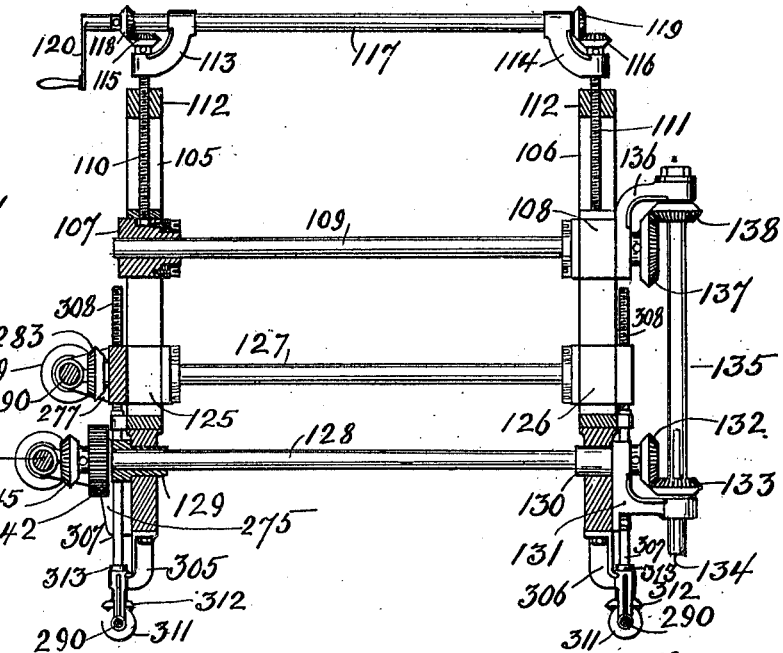

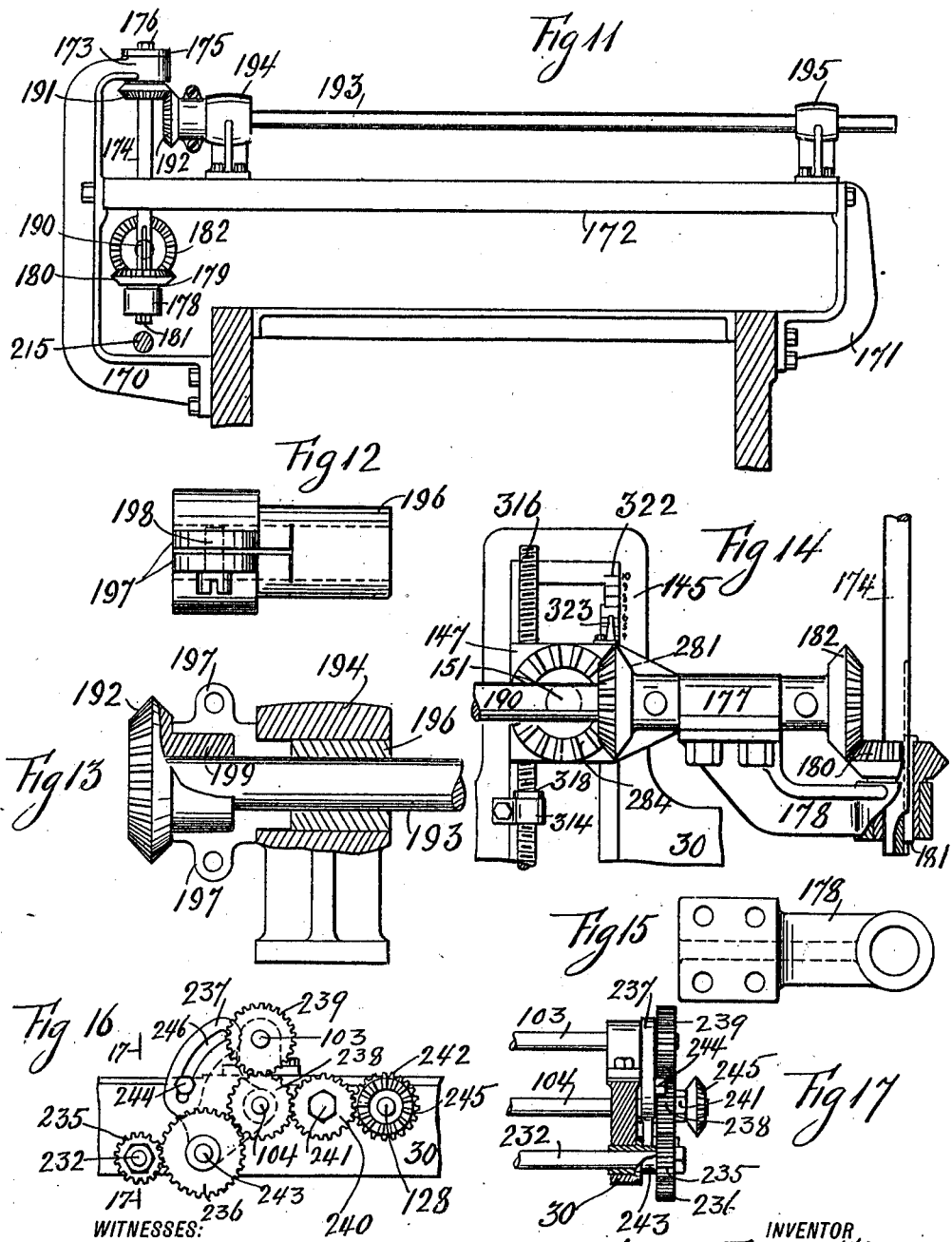

UNITED STATES PATENT OFFICE.

ANDERS JOHAN WIKANDER, OF SOUTH WINDHAM, CONNECTICUT, ASSIGNOR OF ONE-HALF TO AXEL THEODOR JOHNSON, OF BROOKLYN, NEW YORK.

GEARING.

978,252.     Specification of Letters Patent.     Patented Dec. 13, 1910.

Original application filed February 4, 1907, Serial No. 355,623. Divided and this application filed August 5, 1907. Serial No. 387,119.

*To all whom it may concern:*

Be it known that I, ANDERS JOHAN WIKANDER, a citizen of the United States, and a resident of South Windham, in the county of Windham and State of Connecticut, have invented certain new and useful Improvements in Gearing, of which the following is a specification.

This invention relates to adjustable shafts with transmission gearing and is a divisional application from patent application for bag making machine filed Feb. 4, 1907, Serial Number 355,623. Its object is the production of a frame with a rotary side shaft, and an adjustable side shaft parallel thereto, other shafts at right angles to the side shafts, and transmission gearing between all the shafts.

Figure 1:
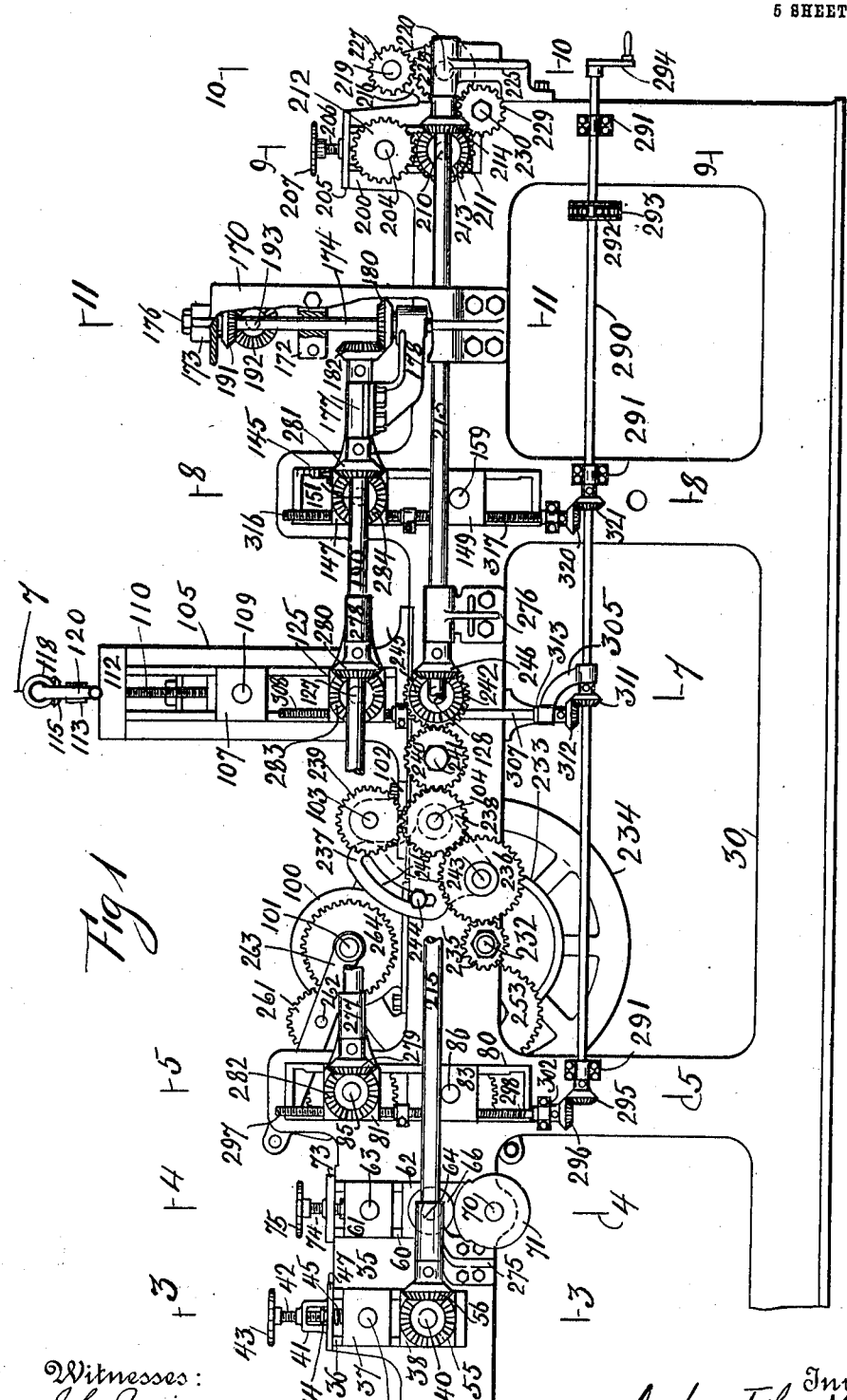
Figure 2:
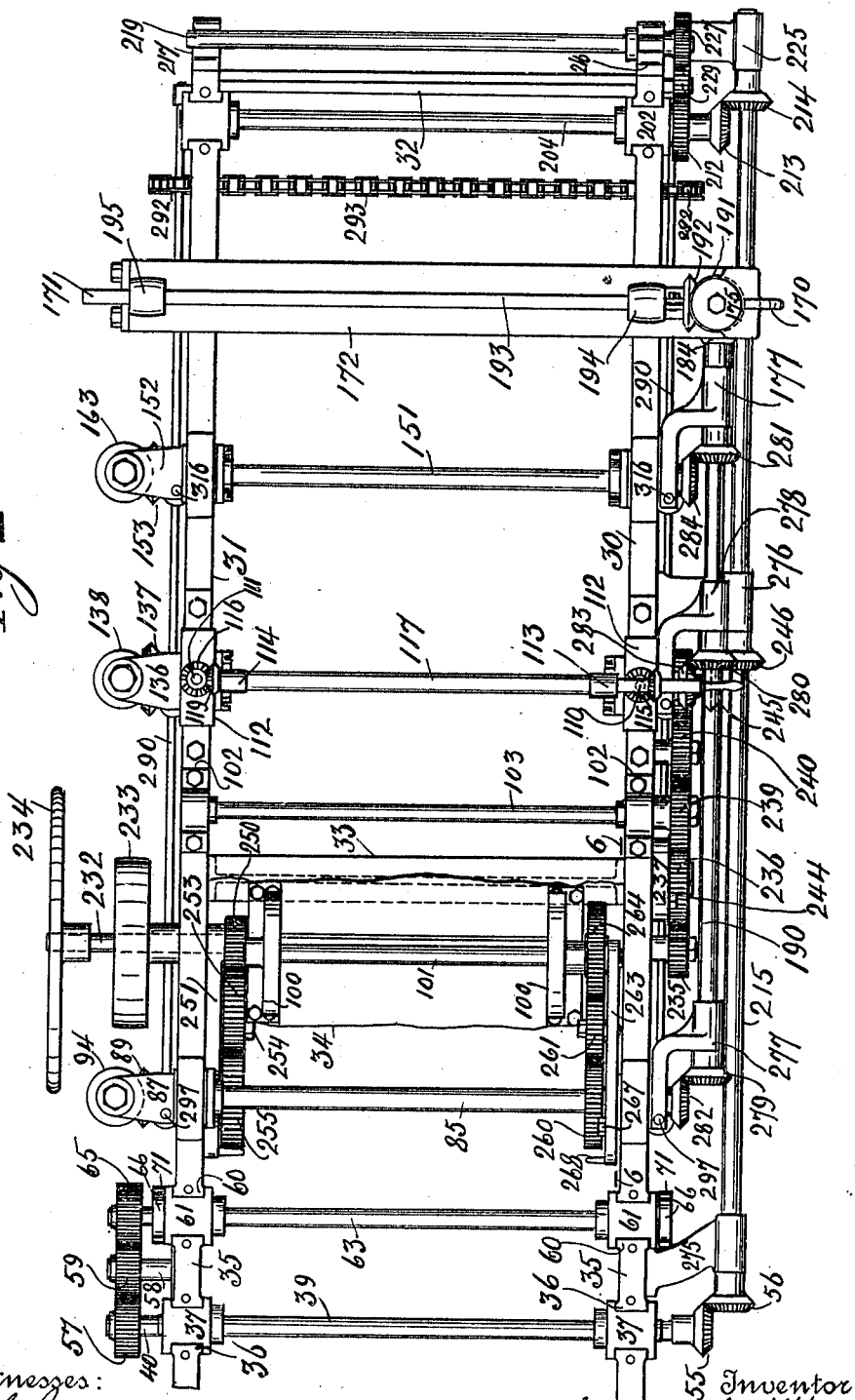
Figure 3:
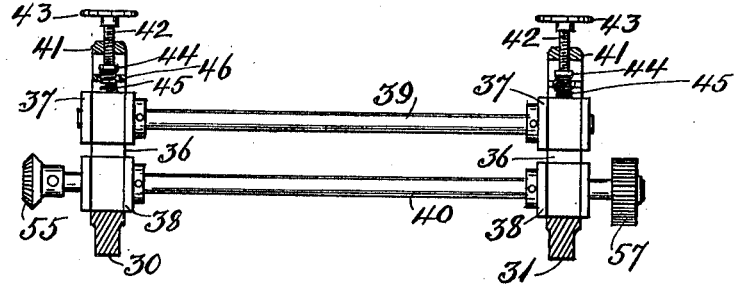
Figure 4:
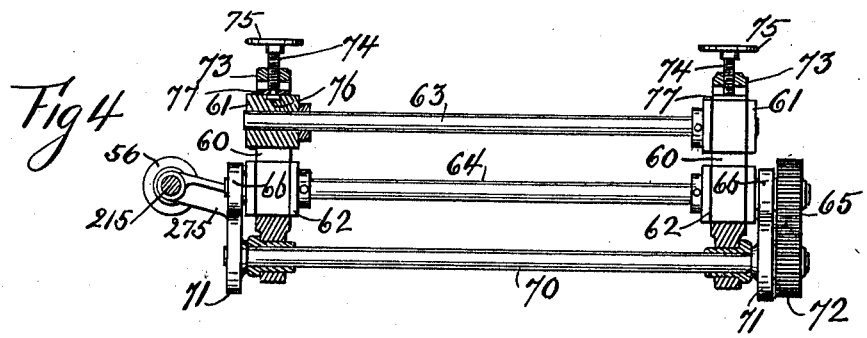
Figure 5:
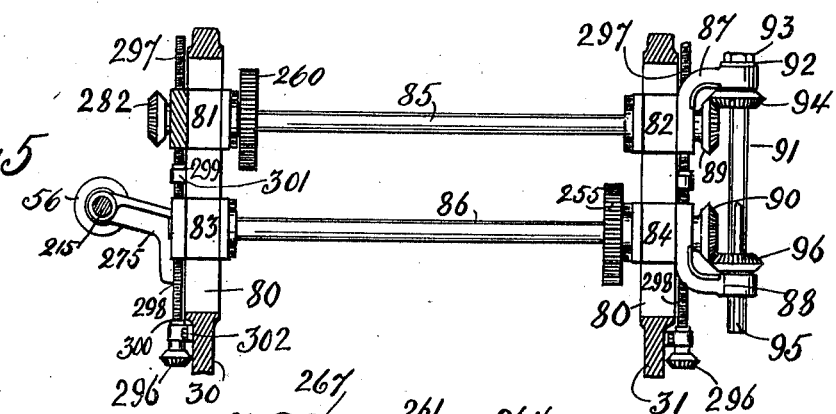
Figure 6:
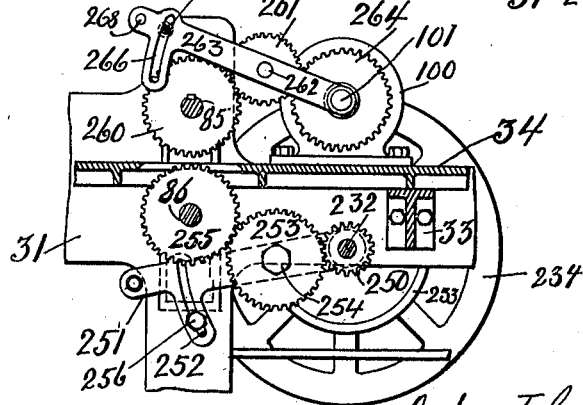

Figure 1 exemplifies a partial side elevation of the invention, Fig. 2 represents a partial top plan view of Fig. 1, Fig. 3 shows a partial section of Fig. 1 on the line 3, 3, Fig. 4 is a section of Fig. 1 on the line 4, 4, Fig. 5 represents a section of Fig. 1 on the line 5, 5, Fig. 6 is a section of Fig. 2 on the line 6, 6, Fig. 7 shows a section of Fig. 1 on the line 7, 7, Fig. 8 is a section of Fig. 1 on the line 8, 8, Fig. 9 represents a section of Fig. 1 on the line 9, 9, Fig. 10 shows a partial section of Fig. 1 on the line 10, 10, Fig. 11 represents a partial section of Fig. 1 on the line 11, 11, Fig. 12 shows a top view of a detail of Fig. 11, Fig. 13 is a partial enlarged view and section of Fig. 1 on the line 11, 11, Fig. 14 shows an enlarged portion of Fig. 1, Fig. 15 is a top view of a detail of Fig. 14, Fig. 16 is a view showing a portion of Fig. 1, Fig. 17 is a section of Fig. 16 on the line 17, 17.

The invention is represented with a pair of main frames 30, 31, having the connecting cross frames 32, 33, and a platform or table 34. The said main frames have extending up therefrom lugs 35 in which are formed guides 36 for the cross-heads 37 and 38, in which latter are respectively journaled cross-shafts 39 and 40. The guides 36 have bolted to them at their upper ends the brackets 41 that are threaded for the screws 42, having the hand wheels 43 and the collars 44. Below the collars 44 are placed springs 45 which bear on the cross-heads 37, suitable openings 46 being formed in the feet 47 of the brackets 41.

On one end of the cross-shaft 40 is fastened the bevel gear 55 that meshes with and is driven by the bevel gear 56, and to the other end of the shaft 40 is fastened the gear 57. From the main frame 31 extends the pin 58 on which is journaled the gear 59 that meshes with the gear 57. In each of the lugs 35 are also formed guides 60 for the cross-heads 61 and 62. In the cross-heads 61 are journaled the ends of the shaft 63, and in the cross-head 62 is journaled the shaft 64. A gear 65 on one end of the shaft 64 meshes with the gear 59, and on each end of said shaft 64 is fastened a roller 66. Below the shaft 64 is journaled in the main frames a cam shaft 70 to which are fastened the cam wheels 71, that engage with their accompanying rollers 66. A gear 72 on the cam shaft 70 meshes with the gear 65 on the shaft 64. On top of the guides 60 are secured the caps 73 which are threaded for the screws 74 having the hand wheels 75 and the collars 76, which latter project into cavities in the top ends of the cross-heads 61. Plates 77 secured to the top faces of the cross-heads 61 maintain the collars 76 in place, and consequently connect the screws 74 with said cross-heads 61.

Guides 80 are formed in the frames 30 and 31 for the cross-heads 81, 82, 83, 84. In the cross-heads 81, 82 is journaled the cross-shaft 85, and in the cross-heads 83, 84 is journaled the cross-shaft 86. The cross-head 82 has extending therefrom the bracket 87, and the cross-head 84 has a similar bracket 88. A bevel gear 89 is fastened to the cross-shaft 85, and a bevel gear 90 is fastened to the cross-shaft 86. A vertical shaft 91 with a collar 92 and screw 93 extends from the bracket 87 down to and through the bracket 88. A bevel gear 94 is fastened to the vertical shaft 91 and meshes with the bevel gear 89. A spline 95 on the shaft 91 holds a bevel gear 96 also on said vertical shaft 91, the latter gear meshing with the bevel gear 90 on the cross-shaft 86. On the table 34 are secured housings 100 in which is journaled the cross shaft 101. A pair of pillow blocks 102 extend up from the main frames 30, 31 and support a cross shaft 103.

A cross shaft 104 is journaled in the main frames vertically below the shaft 103.

Guide brackets 105, 106 extend up from the main frames 30, 31 and guide the cross-heads 107, 108, which support a shaft 109. From the cross-head 107 extends the vertical screw 110, and from the cross-head 108 extends the vertical screw 111. Each of the said screws passes through a threaded cap 112. At the top of the screw 110 is located a bracket 113, and at the top of the screw 111 is located a bracket 114. The screw 110 carries a bevel gear 115, and the screw 111 carries a bevel gear 116. A top cross-shaft 117 is journaled in bearings in the brackets 113 and 114. On the ends of the top cross shaft 117 are fastened the bevel gears 118 and 119, that mesh with the bevel gears 115 and 116 respectively, and a crank handle 120 extends from the shaft 117.

Below the cross-heads 107, 108, in the guides 105, 106 are located the cross-heads 125, 126 in which is journaled the shaft 127. Below the shaft 127 is journaled the shaft 128, in the journal bearings 129, 130, and the latter passes through the bracket 131. A bevel gear 132 is fastened to the shaft 128, which meshes with a bevel gear 133, that is supported on a spline 134 of the vertical shaft 135. From the cross-head 108 extends the bracket 136 through which passes the shaft 109, and a bevel gear 137 on the end of the shaft 109 meshes with the bevel pinion 138 secured to the vertical shaft 135.

Guides 145, 146 extend from the main frames and in which are located the upper cross-heads 147, 148, and the lower cross-heads 149, 150. In the cross-heads 147, 148 is journaled the cross-shaft 151. From the cross-head 148 extends the journal bracket 152, through which the shaft 151 passes, the latter carrying the bevel gear 153. A vertical shaft 154 is journaled in the bracket 152, and a screw 155 with a washer 156 holds the vertical shaft 154 in proper position.

A journal bracket 157 extends from the cross-head 150, and a bevel gear 158 is fastened on the shaft 159. The vertical shaft 154 carries a spline 160 which engages with a bevel gear 161, the boss 162 of the latter bevel gear being journaled in the bracket 157.

To the main frames 30 and 31 are respectively bolted the brackets 170, 171 which are joined by the connecting brace 172. In the bracket 170 is formed a bearing 173 for the vertical spindle 174, on the top of which is supported a plate 175, and a screw 176 screwed into the top end of the vertical spindle 174 holds the latter in place. To a journal bracket 177 is bolted the journal bracket 178 which constitutes a bearing for a sleeve 179 extending from the bevel gear 180, which latter can slide on the spindle 174 and is engaged therewith by means of the spline 181. A bevel gear 182 on an adjustable side shaft 190 to be described meshes with the bevel gear 180. At the top of the spindle 174 is fastened the bevel gear 191, which meshes with a bevel gear 192 that rotates with the cross-shaft 193. The latter shaft is supported in the journal bearings 194 and 195. In the former a split bushing 196 has the jaws 197 which are clamped by the bolts 198, and the said bushing is tightened on the boss 199 of the bevel wheel 192 and also on the shaft 193.

From the frames 30, 31 (for details see Fig. 9) extend guides 200, 201 in which are located the upper cross-heads 202, and the lower cross-heads 203. In the cross-heads 202 is journaled the cross-shaft 204. Caps 205 on the guides 200, 201, engage screws 206 having hand wheels 207 and collars 208. The latter are held in cavities in the cross-heads 202 by means of cover plates 209.

In the lower cross-heads 203 is journaled the shaft 210, to which is secured a spur gear 211 that meshes with a gear 212 on the shaft 204. A bevel gear 213 on the shaft 210 meshes with the bevel gear 214 on the side shaft 215.

At the ends of the frames 30, 31 (for details see Fig. 10) are bolted the brackets 216, 217 each having open bearings 218, which support the shaft 219. In the latter brackets is also journaled the shaft 220. A bracket 225 with the bearing 226 is bolted to the side frame 30 for the side shaft 215. On the shaft 219 is fastened a spur gear 227 which meshes with a spur gear 228 on the shaft 220. The gear 228 meshes with a pinion 229 on the pin 230, and the pinion 229 meshes with the gear 211.

Bearings are formed in the frames 30 and 31 for the driving shaft 232 on which are supported a pulley 233, and a hand wheel 234. On the end of the shaft 232 on the outside of the frame 30 (see Figs. 1 and 2) is fastened the pinion 235 which meshes with the idler gear 236 that is journaled on a pin 243 carried on the adjustable bracket 237 which is pivoted on the shaft 104. The bracket 237 has the elongated curved opening 246, through which a bolt 244 fastens the said bracket 237 to the frame 30. The shaft 104 has fastened to it the gear 238 which meshes with the idler gear 236, and also meshes with the gear 239 that is fastened on the shaft 103. A second idler gear 240 is journaled on a pin 241 and meshes with the gear 242 on the shaft 128. On the end of the latter shaft is fastened the bevel gear 245 which meshes with the bevel gear 246 fastened to the side shaft 215. On the other end of the shaft 232 (for details see Fig. 6) and under the table 34 is fastened the pinion 250. On the said shaft 232 is pivoted the adjustable bracket 251 with the elongated opening 252. On the bracket 251 is journaled an idler gear 253 by means of the journal pin 254, and which meshes with the pinion 250. The idler gear 253 also meshes with the gear 255 on the shaft 86.

On the shaft 85 is fastened a spur gear 260 that meshes with an idler gear 261, the latter being journaled on a pin 262 on the adjustable bracket 263. The gear 261 meshes with the spur gear 264 on the shaft 101. The bracket 263 is fulcrumed on the shaft 101, and it contains at its outer end the elongated opening 266 through which passes a bolt 267, that screws into the side frame 30. A handle 268 extends from said bracket 263.

To the frame 30 of the machine are bolted the journal brackets 275 and 276 which in conjunction with the bracket 225 support the main side shaft 215. The adjustable side shaft 190 is journaled above and parallel to the main side shaft 215, in the journal bracket 277 extending from the cross-head 81, the journal bracket 278 extending from the cross-head 125 and the journal bracket 177 extending from the cross-head 147.

The adjustable side shaft 190 has fastened thereto the bevel gears 279, 280 and 281 which mesh respectively with the bevel gears 282, 283, 284.

On each side of the machine is journaled a shaft 290 in journal brackets 291. Each of the shafts 290 carries a sprocket chain wheel 292, which wheels are connected by a sprocket chain 293. On one of the shafts 290 is secured a crank handle 294, and at the opposite ends of each of the shafts 290 is fastened a bevel gear 295 which meshes with the bevel gear 296 (for details see Fig. 5) connected to a screw with right handed threads 297 at one end, and left handed threads 298 at the other end. Collars 299 and 300 extend from the said screw. Journal brackets 301 and 302 are fastened to the frames 30, 31, and bear up against the collars 299, 300. The threads 297 engage with threaded openings in the cross-heads 81, 82 and the threads 298 engage with the threaded openings in the cross-heads 83, 84.

To the side frames 30, 31 are fastened the journal brackets 305 and 306 (for details see Fig. 7) which support the shaft 290 and the vertical shafts 307. On the upper ends of the shafts 307 are formed the right handed threads 308 that engage with threaded openings in the cross-heads 125, 126. Bevel gears 311 on the shafts 290 mesh with the bevel gears 312 on the vertical shafts 307. Collars 313 on the shafts 307 bear on the journal brackets 305, 306.

Journal brackets 314 and 315 (for details see Fig. 8) support vertical shafts with the right handed threads 316 and left handed threads 317. Collars 318 and 319 bear respectively on the brackets 314 and 315. The right handed threads 316 engage with the threaded openings in the cross heads 147, 148, and the left handed threads 317 engage with threaded openings in the cross-heads 149, 150. Bevel gears 320 mesh with the bevel gears 321 on the shafts 290.

On one of the members of the guides 145 is marked a scale 322, and a pointer 323 is secured to the cross-head 147.

To operate the invention the driving shaft 232 is rotated by means of belting on the pulley 233. The shaft 232 can be turned by means of the hand-wheel 234. The rotation of the shaft 232 is transmitted to the shaft 86 through the gears 250, 253 and 255. The relative position of the shaft 86 to the driving shaft 232 can be varied, by clamping the bracket 251 in different positions to the frame 31 by means of the bolt or screw 256. The rotations of the shaft 86 are communicated to the shaft 85 by means of the bevel gear 90 meshing with the bevel gear 96, the latter engaging the vertical shaft 91 through the spline 95. The rotations of the latter shaft are communicated to the shaft 85 by the bevel gears 94, 89. The shaft 91 can be moved vertically with respect to the bevel gear 96. The bevel gear 282 on the shaft 85 meshes with the bevel gear 279 and thereby rotates the adjustable side shaft 190. The bevel gear 280 on the shaft 190 meshing with the bevel gear 283 rotates the shaft 127. The bevel gear 281 on the shaft 190 meshes with the bevel gear 284 and rotates the shaft 151. The rotation of the shaft 85 is communicated to the shaft 101 by means of the gears 260, 261, 264. The bracket 263 can be clamped in different positions by means of the bolt 267, to suit different positions of the shaft 85. The rotation of the shaft 151 is communicated to the shaft 159 by reason of the bevel gear 153 meshing with the bevel gear 163 on the vertical shaft 154, which latter is in engagement with the bevel gear 161 that meshes with the bevel gear 158. The cross-shaft 159 can be moved vertically by reason of the bevel gear 161 engaging with the spline 160. The bevel gear 182 on the shaft 190 meshing with the bevel gear 180 rotates the vertical shaft 174, which latter through the bevel gears 191, 192, rotates the cross-shaft 193. The bevel gear 180 is vertically movable on the shaft 174 by virtue of the spline 181.

The driving shaft 232 through the train of gearing 235, 236, 238, 240, 242, 245 and 246 rotates the main side shaft 215, when the gear 236 meshes with the gears 235 and 238. The gear 236 being capable of being placed out of mesh with said gears 235 and 238 by lowering the bracket 237, and which is accomplished by clamping the said bracket 237 in a lowered position on the frame 30 with the bolt 244.

The bevel gear 56 on the shaft 215 meshing with the bevel gear 55 rotates the shaft 40. The rotation of the shaft 40 is transmitted to the shaft 64 by means of the gears 57, 59 and 65, and the gears 65 and 72 transmit motion from the shaft 64 to the shaft 70. The cams 71 alternately raise and lower the shaft 64, the clearance between the gears 65 and 72 allowing the same.

The bevel gear 246 meshing with the bevel gear 245 communicates motion from the shaft 128 to the shaft 215. The rotation of the shaft 128 is communicated to the shaft 109, by reason of the bevel gear 132 meshing with the bevel gear 133, which latter drives the vertical shaft 135 with the bevel gear 138. The latter gear meshing with the bevel gear 137 rotates the shaft 109. The bevel gear 214 on the shaft 215 meshes with the bevel gear 213, which rotates the shaft 210. The spur gear 211 on the shaft 210 meshing with the spur gear 212 rotates the shaft 204. The pinion 229 meshing with the spur gears 211 and 228, transmits rotation from the shaft 210 to the shaft 220. The rotation of the shaft 220 is communicated to the shaft 219 by reason of the spur gear 228 meshing with the spur gear 227.

The adjustable side shaft 190 can be either raised or lowered to allow the attachment of appurtenances of different sizes on the cross-shafts with which it is in gear. To raise or lower the shaft 190, an operator turns the crank handle 294 when both the shafts 290 will rotate by reason of their connection with the sprocket chain 293. The rotation of the shafts 290 are communicated to the vertical shafts with the threads 316 and 317 through the bevel gears 320, 321, and the said threads cause the cross-heads 147, 149 and 148, 150 to approach or recede from each other, the vertical movements of the cross-heads 147 and 148 being communicated to the shaft 190. The same action takes place with the shaft 190 and the cross-heads 81, 83, and 82, 84. The shaft 109 can be raised or lowered by turning the crank handle 120 which rotating the shaft 117, causes the screws with the threads 110 and 111 to rotate, the latter engaging with the cross-heads 107 and 108 that support the shaft 109. The rotation of the shafts 290 rotates the vertical spindles 307, having the threads 308 which engaging with threaded openings in the cross-heads 125 and 126 raises or lowers the same as also the shaft 190.

The level of the adjustable shaft 190 is indicated by means of the pointer 323 and the scale 322.

An evident modification of the invention consists in substituting spiral gears for the pairs of bevel gears 295, 296, 311, 312, 320, 321, and various other means may be employed to connect the shafts 290 with the vertical screws that engage with the cross-heads located in the guides extending from the frames 30, 31.

Having described my invention, I claim:

1. The combination in a machine of a driving shaft, a rotary side shaft, an adjustable side shaft journaled adjacent to the said rotary shaft, adjustable gearing between the driving shaft and the said adjustable side shaft, and gearing between the rotary side shaft and said driving shaft.

2. The combination of a pair of frames having a number of pairs of guides, a pair of cross-heads in each pair of guides, a bracket extending from one of the cross-heads of each pair, a side shaft journaled in said brackets, a cross-shaft journaled in each pair of cross-heads, a gear on each cross-shaft, and an accompanying gear for each one thereof on the side shaft to mesh therewith, vertical screws journaled on each frame, each one of said screws engaging with a thread in each of the cross-heads, a bevel gear on each of the vertical screws, a second side shaft journaled to one of the frames below the first side shaft, bevel gears on the second shaft, each of the latter bevel gears gearing with a bevel gear of one of the screws, a third side shaft journaled to the other frame, bevel gears on the third side shaft, bevel gears on the screws adjacent to the third side shaft, the latter bevel gears meshing with the gears on said third shaft, connections between the second and third side shafts, means to turn one of the latter shafts, and thereby operate the appurtenances co-acting therewith.

3. The combination of a pair of shafts, means to vary the level of one shaft with respect to the other, an indicator to indicate the distance between the shafts, a driving shaft, adjustable gearing between the latter shaft and each one of the pair of shafts.

4. The combination of a pair of frames, each frame having a guide and one of said frames having a scale thereon, a side shaft journaled to one of said frames, an adjustable side shaft parallel to the side shaft, a gear on the adjustable side shaft, a driving shaft journaled in the frames, a pair of cross-heads in the guides, a cross-shaft journaled in the cross-heads, a gear on the cross-shaft with its teeth meshing with the teeth of the gear on the adjustable shaft, means to vertically move the adjustable shaft with the cross-heads and their cross-shaft, a pointer on one of the cross-heads for said scale, gearing interposed between the driving shaft and said side shaft, and gearing interposed between the driving shaft and said adjustable side shaft.

5. The combination of a pair of frames, a number of pairs of guides formed therewith, a pair of cross-heads in each pair of guides, a bracket extending from one of the cross-heads of each pair, a side shaft journaled in said brackets, a cross-shaft journaled in each pair of cross-heads, connecting means between the cross-shafts and the side shaft, an element engaging with each of the cross-heads, a second shaft adjacent to each frame below the first side shaft, connections between said elements and said second shafts, means to simultaneously rotate the second shafts, and thereby operate the appurtenances connected therewith.

6. The combination of a pair of frames, a number of pairs of guides formed therewith, a pair of cross-heads in each pair of guides, a bracket extending from one of the cross-heads of each pair, a side shaft journaled in said brackets, a cross-shaft journaled in each pair of cross-heads, a gear on each cross-shaft, and an accompanying gear for each one thereof on the side shaft to mesh therewith, vertical screws journaled on each frame, each one of said screws engaging with a thread in each of the cross-heads, a second horizontal shaft journaled to each of the frames below the first side shaft, connections between the screws and said second shafts, connections between the two second shafts, means to simultaneously rotate the second shafts, and thereby operate the appurtenances connected therewith.

7. In a machine the combination of a side shaft, an adjustable side shaft journaled parallel thereto, a pair of cross shafts journaled in the machine, adjustable connections between the cross-shafts, gearing interposed between one of said cross-shafts and the said adjustable side shaft, a driving shaft, adjustable gearing between the driving shaft and the said side shaft, an adjustable bracket pivoted on the driving shaft, a gear journaled on the said bracket, a pinion journaled on the driving shaft with its teeth meshing with the teeth of the gear journaled on said bracket and a gear on one of the cross-shafts with its teeth meshing with the teeth of the gear on said adjustable bracket.

8. In a machine the combination of a side shaft, an adjustable side shaft journaled parallel thereto, a driving shaft journaled in the machine, a pinion on the driving shaft, gearing interposed between the driving shaft and said adjustable side shaft, an adjustable bracket pivoted in the machine, a gear pivoted on the said bracket with its teeth meshing with the teeth of the pinion on the driving shaft and gearing interposed between the said gear on the adjustable bracket and the said side shaft of the machine.

Signed at Willimantic, in the county of Windham and State of Connecticut this 27th day of July A. D. 1907.

ANDERS JOHAN WIKANDER.

Witnesses:
GEORGE W. MELONY,
CARL E. OMAN.